United States Patent
Gäbele (10) Patent No.: US 12,303,847 B2
(45) Date of Patent: May 20, 2025

(54) COMPACT DEVICE FOR PRODUCING FOAM FOR WELLNESS AND/OR HYGIENE APPLICATIONS

(71) Applicant: Klafs GmbH, Schwäbisch Hall (DE)

(72) Inventor: Markus Gäbele, Schwäbisch Hall (DE)

(73) Assignee: KLAFS GMBH, Schwabisch Hall (DE)

( * ) Notice: Subject to any disclaimer, the term of this patent is extended or adjusted under 35 U.S.C. 154(b) by 404 days.

(21) Appl. No.: 17/859,518

(22) Filed: Jul. 7, 2022

(65) Prior Publication Data
US 2023/0009558 A1 Jan. 12, 2023

(30) Foreign Application Priority Data
Jul. 9, 2021 (EP) .................................. 21184881

(51) Int. Cl.
| | | |
|---|---|---|
| B01F 23/23 | (2022.01) | |
| A47K 5/14 | (2006.01) | |
| A61H 33/00 | (2006.01) | |
| A61H 33/04 | (2006.01) | |
| B01F 23/20 | (2022.01) | |
| B01F 23/231 | (2022.01) | |
| B01F 23/232 | (2022.01) | |
| B01F 23/235 | (2022.01) | |

(Continued)

(52) U.S. Cl.
CPC .............. *B01F 23/291* (2022.01); *A47K 5/14* (2013.01); *A61H 33/0095* (2013.01); *A61H 33/04* (2013.01); *B01F 23/23* (2022.01); *B01F 23/231264* (2022.01); *B01F 23/232* (2022.01); *B01F 23/235* (2022.01); *B01F 23/237611* (2022.01); *C02F 1/008* (2013.01); *C02F 1/50* (2013.01); *A61H 2033/0037* (2013.01); *A61H 2033/043* (2013.01); *B01F 2101/305* (2022.01); *B01F 2101/4505* (2022.01); *C02F 2209/02* (2013.01); *C02F 2303/04* (2013.01)

(58) Field of Classification Search
CPC . B01F 23/235; B01F 23/20; B01F 23/231264
USPC .............................................. 261/70, DIG. 26
See application file for complete search history.

(56) References Cited

U.S. PATENT DOCUMENTS

| | | | | |
|---|---|---|---|---|
| 1,834,646 | A * | 12/1931 | Sandor .................. | A62C 5/002 |
| | | | | 261/DIG. 26 |
| 5,291,951 | A * | 3/1994 | Morand ................... | A62C 5/02 |
| | | | | 169/44 |
| 10,286,335 | B2 * | 5/2019 | Govindan .............. | B01D 5/003 |

FOREIGN PATENT DOCUMENTS

| | | |
|---|---|---|
| GB | 280208 A | 2/1929 |
| JP | 2002078628 A | 3/2002 |
| WO | 2014174294 A1 | 10/2014 |

OTHER PUBLICATIONS

EP Application No. 21184881.7 Extended European Search Report, Issued Jan. 17, 2022, 7 pages.

* cited by examiner

*Primary Examiner* — Robert A Hopkins
(74) *Attorney, Agent, or Firm* — Dickinson Wright PLLC; Steven C. Hurles (57) ABSTRACT

The device includes a vessel to be filled with a mixture of water and a component producing foam, where the vessel comprises a device for blowing air into the mixture to produce foam. It is provided according to the disclosure that the device comprises at least two vessels to be filled with the mixture arranged one above the other in a vertical direction in tiers, where the vessels comprise the device for blowing air into the mixture to produce foam, where the vessels are open towards an outlet region such that the foam produced in the vessels is merged in the outlet region.

13 Claims, 4 Drawing Sheets

(51) Int. Cl.
*B01F 23/237* (2022.01)
*C02F 1/00* (2023.01)
*C02F 1/50* (2023.01)
*B01F 101/00* (2022.01)

COMPACT DEVICE FOR PRODUCING FOAM FOR WELLNESS AND/OR HYGIENE APPLICATIONS

CROSS-REFERENCE TO RELATED APPLICATION

This application claims priority to and the benefit of European Application Serial No. 21184881.7, filed on Jul. 9, 2021 entitled "COMPACT DEVICE FOR PRODUCING FOAM FOR WELLNESS AND/OR HYGIENE APPLICATIONS", the contents of which are herein incorporated by reference.

BACKGROUND

1. Field

The present disclosure relates to a device for producing foam for wellness and/or hygiene applications.

2. Related Art

A device of this kind comprises a vessel to be filled with a mixture of water and a component producing foam, for example, soap, where the vessel comprises a device for blowing air into the mixture of water and soap to produce foam. One such device is taught in JP 2002-078628 A.

The amount of foam that can be produced there in relation to the size of the devices is relatively small. Accordingly, if a large volume of foam is to be produced, for example, to fill a steam bath with foam, then the device takes up much space. In addition, such devices cannot be moved manually at all. A device is therefore required that produces a large volume of foam in a small space.

SUMMARY

The object of the present disclosure is to specify such a device.

The object is satisfied by the features of independent claim 1.

According thereto, the object is satisfied according to the disclosure if the device comprises at least two vessels to be filled with the mixture arranged one above the other in a vertical direction in tiers, where the vessels comprise the device for blowing air into the mixture to produce foam, and where the vessels are open towards an outlet region such that the foam produced in the vessels is merged in the outlet region.

As a result, the device provides an increased surface area for the mixture of water and the component producing foam, which is proportional to the foam volume that can be produced with a smaller overall base area of the device. Alternatively, the same amount of foam can be produced per unit of time as with conventional devices but with less consumption of water and the component producing foam, which confirms a very low-consumption method.

The foams produced in the vessels merge into one another. This allows a large amount of foam to be produced in a selective manner. When merging the foams, larger foam bubbles can furthermore form in part. The larger foam bubbles allow for increased foam volume with a reduced water content.

"Air" in the context of the present disclosure is to be understood to mean both breathable air as well as any other gas mixture that can be used to produce foam. However, breathable air or ambient air is preferably used.

Advantageous embodiments of the present disclosure are the object of the dependent claims.

According to a preferred embodiment, the vessels have openings facing the outlet region and a height between the bases of the vessels and the upper sides of the vessels increases towards the openings. As a result, the foam is guided to the outlet region without destroying it. In a particularly preferred embodiment, the upper sides are formed to be curved. As a result, even less foam is destroyed when it strikes against the upper sides of the vessels and zones in which foam can accumulate without draining off are also prevented.

According to a particularly preferred embodiment, the vessels are arranged and configured in relation to one another such that water and the component producing foam, which deposit from the foam produced within the device, can flow back into at least one of these vessels so that foam can be produced again with this water and the component producing foam. As a result, it can be achieved that the water and the component producing foams, which have deposited from the foam produced within the device, can be reused for producing foam. This enables very efficient foam production in relation to the volume of water and component producing foam used.

According to a further embodiment, a base area of the upper vessel is smaller than the base area of the lower vessel. As a result, the foam produced in the lower vessel can pass through the upper vessel, even if the bases of the vessels largely overlap, and merge there with the foam that is produced in the upper vessel.

A common projection area of the base areas of the vessels onto a plane parallel to the base areas of the vessels in a further preferred embodiment corresponds to the base area of the vessel with the largest base area. With this arrangement, the base area of the entire device can be kept small and a large added area of the base areas of the vessels can still be obtained, which is relevant for high foam production.

In a preferred embodiment, the devices for blowing air in are configured such that the air is introduced over a large area along the bases of the vessels. A large area along the bases in this context means that the air is introduced into the container or into the mixture contained therein in the region of an area of at least 40% of the area of the base of a vessel just above the base or from the base. This allows for the area on which foam is produced per vessel to be maximized, which in turn maximizes the amount of foam that can be produced. Preferably, air is introduced over at least 60%, more preferably over at least 90%, of the area of the base of a vessel.

In a preferred embodiment, the devices for blowing air in comprise bubble plates, membranes, or films. Air bubbles are introduced into the mixture in the vessels through the bubble plates, membranes, or films using the device for blowing air in. The bubble plates, membranes, or films are arranged in the mixture in the vessels or in part form the bases of the vessels. By using bubble plates, air can be blown into the individual vessels in an inexpensive and efficient manner. The bubble size and general consistency of the foam can be influenced by a suitable selection in terms of the hole size, the hole geometry, and the arrangement of the holes. The same applies to membranes and films. The bubble plates, membranes, or films are preferably configured such that no water can flow back through the bubble plates, membranes, or films when no air is blown in. As a result, water can be saved and the air supply apparatus is protected from the influence of water.

In a further embodiment, the bubble plates, membranes, or films of the device for blowing air in are exchangeable. Such an exchange allows for the foam properties to be adjusted, for example, by using a bubble plate with a different hole size. Properties of the bubble plates, membranes, or films can preferably also be adapted without exchanging the entire component. More preferably, the properties of the bubble plates, membranes, or films can be adjusted during operation of the device. This allows for the user to adjust foam properties during operation.

In a preferred embodiment, the devices for blowing air in comprise a controllable ventilation unit which controls the amount of air introduced into the vessels. As a result, optimal air supply can be obtained to control the foam quantity and foam quality. The foam properties, such as the bubble size, can likewise be influenced by the amount of air introduced. A separate ventilation unit is preferably connected to each vessel. This allows for the air supply to be adjusted selectively for each vessel, which again enables more precise control of the foam quantity and foam quality. The air is preferably supplied by way of one or more fans.

The device in a particularly preferred embodiment comprises a water level adjustment system in the vessels. By keeping the water level in the vessels at a certain level, the efficiency of foam production is increased. It can thus be ensured, inter alia, that no container contains no mixture of water and the component producing foam for a short time. As a result, air from the device for blowing air in would be blown directly into the foam already produced, which would lead to the destruction of the foam. In addition, depending on the air injection, there is a preferred water level range for foam production in which foam production can be maximized. The water level adjustment system in the vessels allows for the water level to be kept within this preferred range. There are various ways in which such a water level adjustment system could be configured. In a preferred embodiment of the water level adjustment system, the individual vessels comprise water inlets with valves, where the addition of water is controlled by the valves using a float switch or a sensor for measuring the water level. By controlling the addition of water and thereby the water level for each individual vessel, it is possible to react particularly well to different foam productions and therefore to the amount of water lost from the individual vessels. A further likewise preferred embodiment of the water level adjustment system, however, manages with only one water supply in the upper vessel. All vessels except for the lower vessel have an overflow at the height of the preferred water level, where the overflow is configured such that the water is supplied into the respective vessel disposed therebelow. The lower vessel, on the other hand, comprises a float switch or other sensor for measuring the water level. If there is not enough water in the lower vessel, water is added to the upper vessel, causing the vessels in between to overflow, until there is sufficient water in the lower vessel. More preferably, the vessels above the lower vessel also comprise a float switch or other sensor for measuring the water level. The respective vessel having a low water level can then be filled using the same method. The device can preferably simultaneously stop the air supply of the respectively controlled bubble unit by controlling the water level if the water level is too low, thereby increasing the efficiency in the remaining foam production tiers and no foam is destroyed by the air currents.

The water level adjustment system in the vessels is preferably connected to an external water supply and/or a water tank. Use of a water supply has different advantages than the use of a water tank. When an external water supply is connected to the water level adjustment system, the volume of foam produced by the device is not limited by the amount of water available. Large amounts of foam can then be produced. If a water tank is connected to the water level adjustment system, the foam volume is limited by the volume of the water tank. But the device can be used independently of external conditions and no water supply is required. This enables a mobile device. The device preferably comprises a water tank as well as the option of connecting a water supply. For example, the water tank can have a connection option for a water supply. This further increases the possible uses of the device.

The water level adjustment system in a further preferred embodiment comprises a water temperature control unit. This allows the foam temperature to be controlled and adapted to the needs of the user. The water temperature control unit can preferably be configured as a flow-type heat exchanger if only one water supply is connected and the device does not have a water tank. The water temperature control unit in a further preferred embodiment is integrated into the water tank. Particularly preferably, the water temperature control unit in the water tank comprises a cooling unit, such as a cold pack. It can be used to produce also cold foam, which enables a very special bathing experience.

The device in a particularly preferred embodiment comprises a component addition producing foam which is connected to the water level adjustment system. The ratio between the water and the component producing foam in the mixture in the vessels is very relevant for efficient foam production and should be within a certain range. By combining the component addition producing foam and the water level adjustment system, the ratio between the water and the component producing foam in the mixture introduced into the vessels can be adjusted prior to the introduction into the vessels. For this purpose, the device can comprise, for example, a mixing tap. This makes it easier to obtain the desired ratio. If a water tank is connected to the water level adjustment system in the vessels, the component addition producing foam could also be connected directly to this tank. In certain cases, it makes sense to vary the ratio between the water and the component producing foam in the mixture in the vessels so that the foam produced by the different vessels has different properties. For this purpose, individual component additions producing foam are advantageous which add the component producing foam directly to the respective vessel.

In a further preferred embodiment, the device comprises a disinfectant addition which is connected to the water level adjustment system. By adding disinfectant, any hygiene regulations can be complied with and the foam can be used for a wider range of applications. It makes sense here as well to link the disinfectant addition to the water level adjustment system, as this allows the disinfectant to be introduced efficiently into the vessels at a specific ratio to the water within the water and soap mixture.

In a particularly preferred embodiment, the vessels are enclosed in a housing which comprises a foam outlet opening from the outlet region. The foam produced can be delivered out of the device in a selective manner through the housing and its foam outlet opening. In this case, the housing can advantageously also be used as a way for returning water and the component producing foam, which deposit from the foam produced inside the device, to one of the vessels. A tube is preferably connected to the foam outlet opening. This allows the foam to be used in a very targeted manner. More preferably, a foam outlet head with a controllable foam outlet is connected to the tube. This allows the user to again easily control the foam application and the type of foam.

In a further particularly preferred embodiment, the device comprises a battery for operating the device. Operation with a battery makes it possible for the device to be operated independently of a mains connection. Accordingly, the device can also be moved and used in different places.

In a further embodiment, the device has a hygiene program and/or cleaning program. In these programs, air, water, disinfectant, and/or other cleaning components can be pumped through and/or refilled in one or more regions and components of the device to drain, clean, or disinfect the device.

BRIEF DESCRIPTION OF THE DRAWINGS

Embodiments of the disclosure shall be explained in more detail hereafter with reference to drawings, where.

DETAILED DESCRIPTION

It applies to the following embodiments that like parts are designated by like reference characters. Where a figure contains reference characters which are not explained in more detail in the associated figure description, then reference is made to preceding or subsequent figure descriptions.

Figure 1:
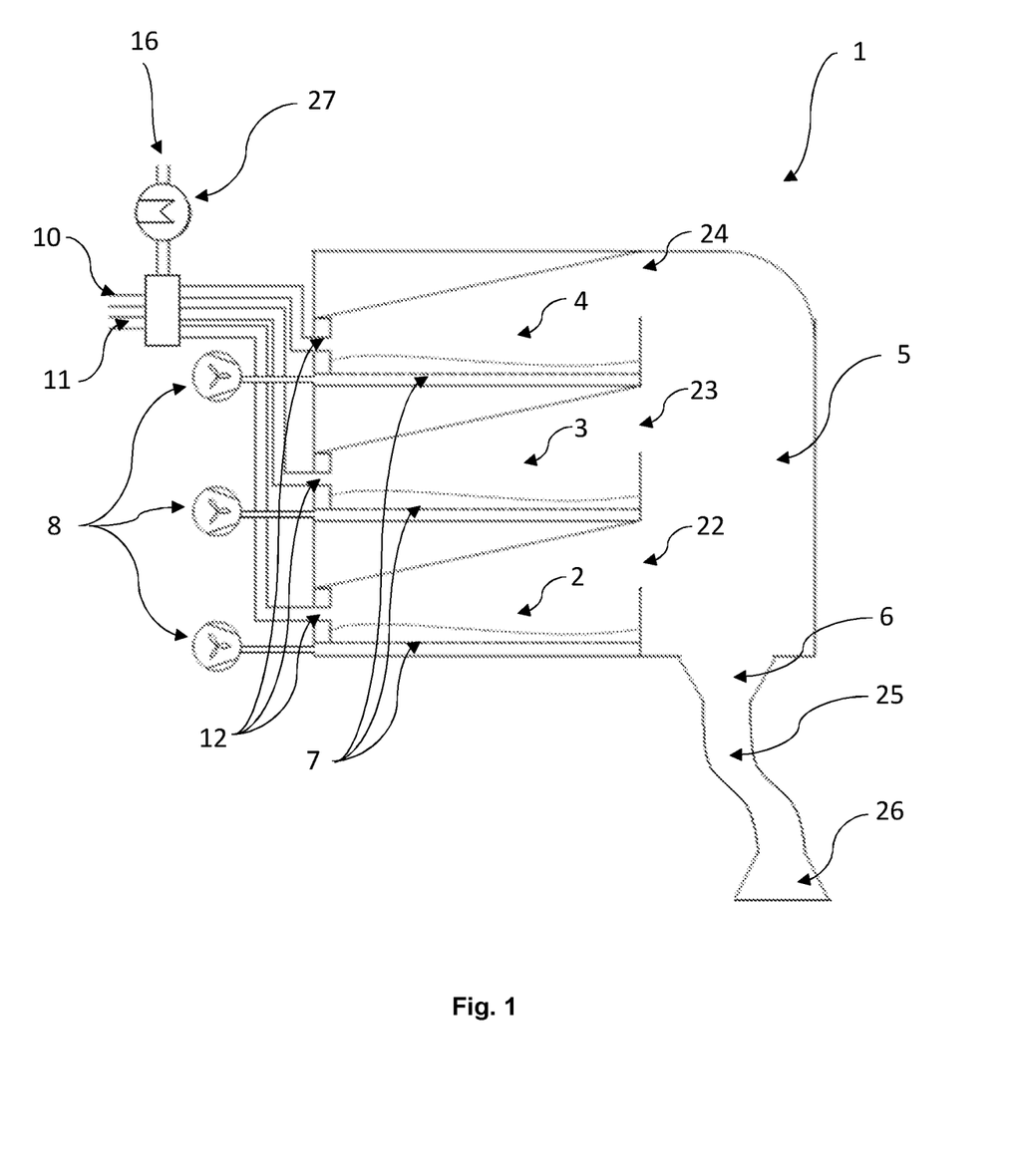
FIG. 1 shows a schematic sectional view of a first embodiment of the device according to the disclosure.

FIG. 1 shows a first embodiment of device 1 according to the disclosure. Device 1 of the first embodiment comprises three vessels 2, 3, 4 arranged one above the other. Vessels 2, 3, 4 have the same base areas and are arranged in tiers one above the other. The vessels each have lateral openings 22, 23, 24 which open vessels 2, 3, 4 toward an outlet region 5. The upper sides or ceilings of vessels 2, 3, 4 are formed to be slanted toward openings 22, 23, 24 so that the height of vessels 2, 3, 4 increases toward openings 22, 23, 24. Arranged at the base of vessels 2, 3, 4 are respective membranes 7 through which air bubbles can be introduced into individual vessels 2, 3, 4 by way of air supply 8. Each vessel 2, 3, 4 is assigned a single ventilation unit.

In addition, vessels 2, 3, 4 have inlets 12 through which a mixture of water, a component producing foam, and disinfectant can be introduced into vessels 2, 3, 4. Inlets 12 are connected to a mixing tap, to which a water supply 16, a supply line 10 for component producing foam and a supply line 11 for disinfectant are in turn connected. Water supply 16 is connected upstream of the mixing tap to a flow-type heat exchanger 27 with which the water temperature and therefore ultimately the foam temperature can be adjusted according to the user's wishes.

Outlet region 5 comprises a foam outlet opening 6 to which a tube 25 is connected A foam outlet head 26 is in turn connected to this tube 25.

The foam production by way of device 1 according to the first embodiment shall be explained hereafter.

For this purpose, the mixture of water, the component producing foam, and disinfectant is supplied to three vessels 2, 3, 4 via supply lines 12, where a predetermined ratio is able to be set at the mixing tap. The supply to the vessels is controlled by valves at the ends of supply lines 12.

The water level of the mixture of water, the component producing foam, and disinfectant is controlled separately for each vessel 2, 3, 4 by way of the sensors. Air is blown into the mixture in vessels 2, 3, 4 via respective membrane 7 by way of air supply 8, where air supply 8 is realized by way of separate ventilation units. This produces foam. The foam produced in respective vessel 2, 3, 4 rises and is guided from the upper sides of housings 2, 3, 4 through respective openings 22, 23, 24 into outlet region 5. The foam produced in vessels 2, 3, 4 is merged accordingly in outlet region 5 and then delivered together through foam outlet opening 6 into tube 25. The foam then travels through tube 24 to foam outlet head 26 and thereby ultimately finally to the user.

Due to the interaction of the sensors with the valves in inlets 12, the water level of the mixture in respective vessels 2, 3, 4 can be kept within a preferred range in which the foam can be produced particularly efficiently. In addition, the foam quantity and foam quality can also be adjusted by way of a controlled air supply 8 by use of the ventilation units, where this is advantageously possible for each vessel due to the separate ventilation units.

Figure 2:
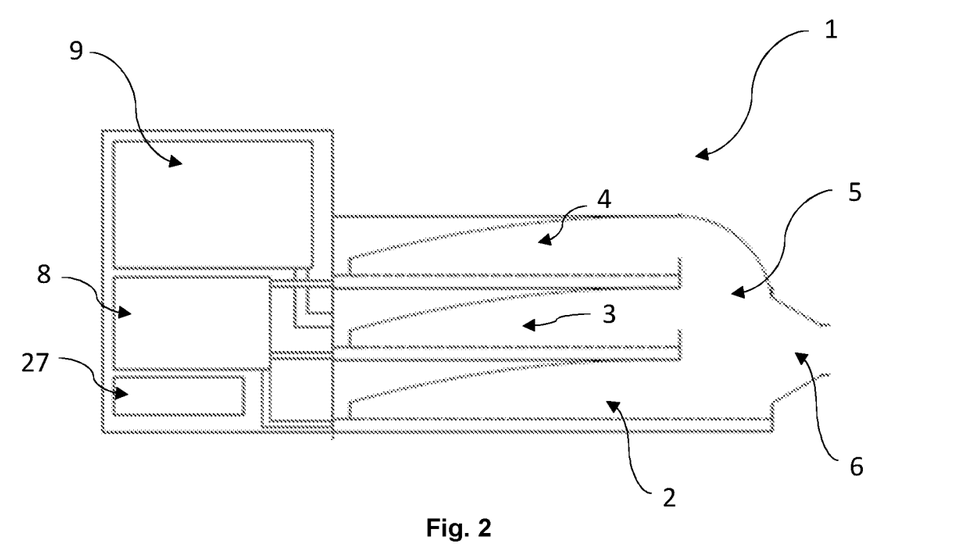
FIG. 2 shows a schematic sectional view of a second embodiment of the device according to the disclosure.

FIG. 2 shows a second embodiment of device 1 according to the disclosure, where the device is suitable in particular for mobile use. Device 1 of the second embodiment comprises a water tank 9 into which the mixture of water, the component producing foam, and disinfectant can also be introduced in order to supply vessels 2, 3, 4 with the mixture from there. However, the component producing foam and the disinfectant can also be admixed downstream of water tank 9 or directly into vessels 2, 3, 4. Water tank 9 can there have a mobile temperature control unit with which the foam temperature can be adjusted. In addition, device 1 of the second embodiment has a bundled air supply 8 and is driven overall by a battery 27.

In contrast to the first embodiment, lowermost vessel 2 of the second embodiment has a larger base area, where this base area is arranged in part below outlet region 5. Water and the component producing foam that deposit from the foam in outlet region 5 then flow back into lowermost vessel 2 and can be reused. This makes the second embodiment particularly efficient in terms of water consumption. Another difference from the first embodiment is that the upper sides of vessels 2, 3, 4 are curved. The foam is thereby guided particularly gently in the direction of outlet region 5.

Figure 3:
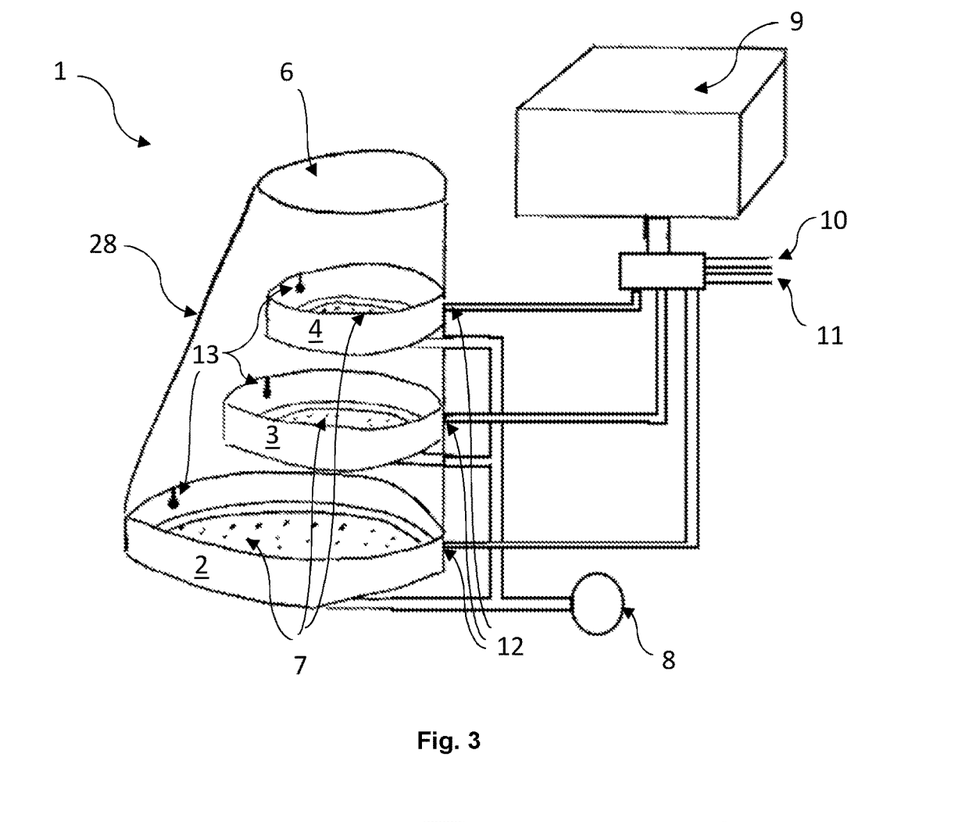
FIG. 3 shows a schematic representation of a third embodiment of the device according to the disclosure.
Figure 4:
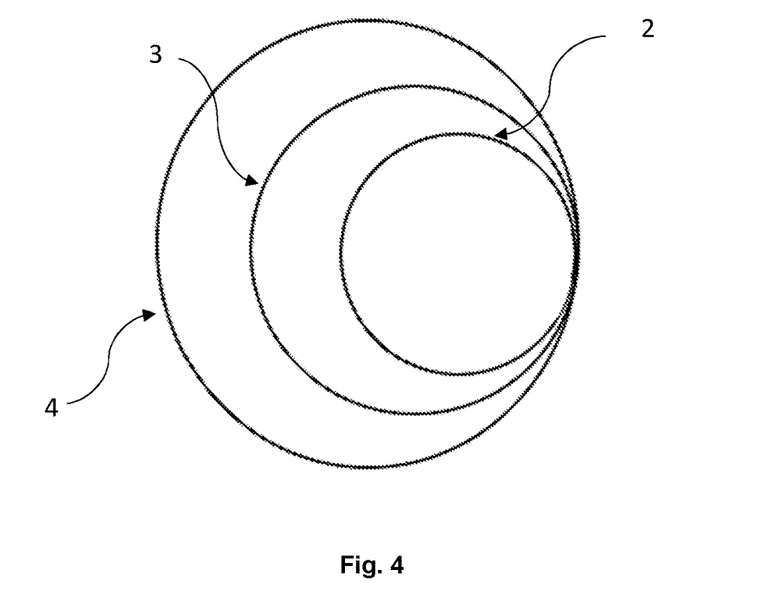
FIG. 4 shows a top view from above onto the base areas of the vessels of the third embodiment.

FIG. 3 and FIG. 4 show a third embodiment of device 1 according to the disclosure. Device 1 of the third embodiment comprises three round vessels 2, 3, 4 arranged one above the other. Lower vessel 2 has the largest base area and upper vessel 4 has the smallest base area. The size of the base area of middle vessel 3 is between the base area of lower vessel 2 and of upper vessel 4. Three vessels 2, 3, 4 are arranged one above the other in a cascade arrangement such that the base areas completely overlap in a horizontal direction.

In the third embodiment, three vessels 2, 3, 4 are enclosed by a housing 28 in the shape of a truncated cone. The base area of truncated cone-shaped housing 28 is the upper edge of lower vessel 2. The housing projects vertically upwardly on one side of housing 28. Middle vessel 3 and upper vessel 4 abut against this vertical side of housing 28. FIG. 4 shows how the edges of the three base areas of three vessels 2, 3, 4 have a common point when viewed from above. Housing 28 is open at the sectional surface of the truncated cone shape and then comprises the foam outlet opening 6.

The three vessels each comprise round bubble plates 7 at their base. Bubble plates 7 are connected to an air supply 8 via a common supply line. The third embodiment furthermore comprises a water tank 9. The water tank is connected to three vessels 2, 3, 4 by way of a mixing tap and corresponding supply lines 12. The component producing foam and disinfectant can be admixed to the water in the mixing tap through a supply line 10 for the component producing foam and a supply line 11 for disinfectant. Attached at the end of these supply lines 12 are respective controllable valves which can control the supply of the mixture of water, soap, and disinfectant into vessels 2, 3, 4.

Vessels 2, 3, 4 also each comprise a sensor 13 which can measure a surface level of the water in the respective vessel. Various possible sensors for this are known to the person skilled in the art.

The difference in foam production by way of device 1 according to the third embodiment 1 shall be explained hereafter.

In the third embodiment, the foam from respective vessel 2, 3, 4 rises to foam outlet opening 6 arranged at the top, where the foam which is formed in lower vessel 2 merges with the foam from middle vessel 3 and pushes it upwards. The foam from lower and middle vessel 2, 3 then merges with the foam from upper vessel 4 and likewise pushes it further upwards. As a result, the foam is conveyed upwardly through foam outlet opening 6 out from housing 28.

Due to the arrangement of vessels 2, 3, 4 and housing 28, water that separates from the foam within housing 28 is passed back into one of vessels 2, 3, 4 and can be used there again for foam production.

Figure 5:
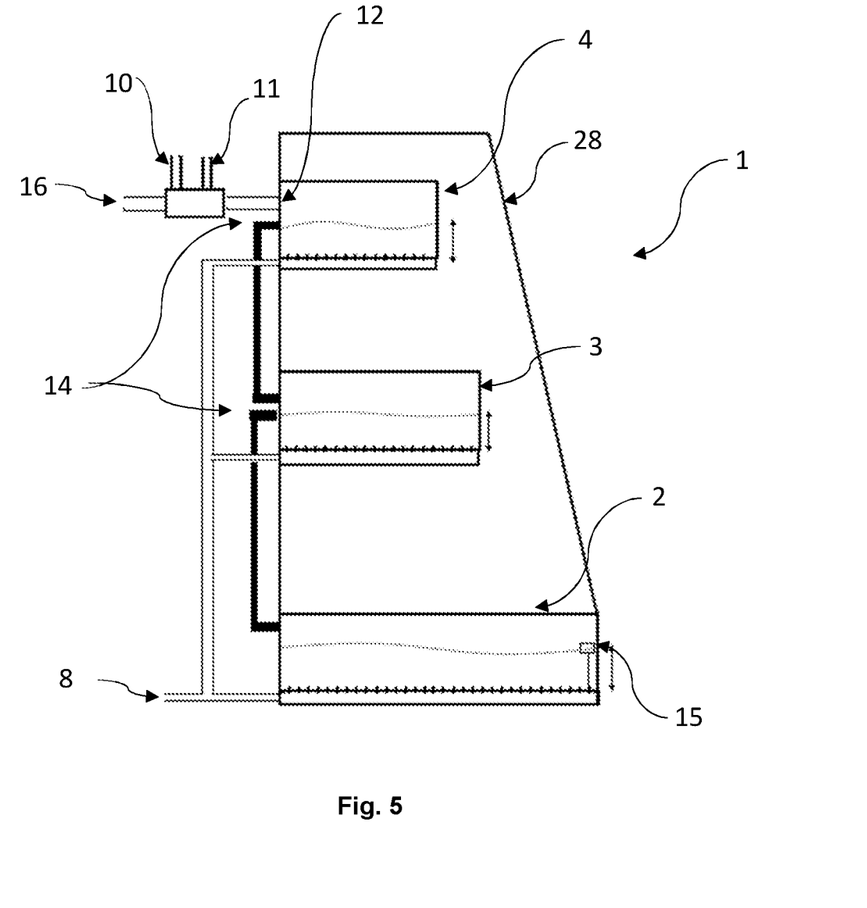
FIG. 5 shows a schematic sectional view of a fourth embodiment.

A fourth embodiment is shown in FIG. 5 and is shown in a horizontal sectional view. The fourth embodiment comprises the same three vessels 2, 3, 4 and the same housing 100 as the third embodiment. Disposed at the base of each of the three vessels is likewise one bubble plate 7 each which is connected to an air supply 8 via common supply lines.

Unlike the third embodiment, device 1 of the fourth embodiment is connected to a water supply 16. Water supply 16 is connected only to upper vessel 4 by way of a valve. Upstream of the valve, component producing foam and disinfectant are admixed to the water in a mixing tap by way of a supply line 10 for the component producing foam and a supply line 11 for disinfectant.

Upper vessel 4 comprises an overflow 14 through which water is transferred to middle vessel 3 once it exceeds the preferred water level in upper vessel 4. Middle vessel 3 also comprises such an overflow 14, where the excess water is transferred to lower vessel 2 accordingly. Disposed in the lower vessel is a float switch 15 which stops the water supply via water supply 16 once the water level in lower vessel 2 is in the preferred range. The water level can therefore be kept in the preferred range in the three vessels by way of a single controlled valve 12. In an embodiment that is not shown, upper vessel 4 and middle vessel 3 can also comprise such float switches 15 so that the water level also in upper vessel 4 and in middle vessel 3 can always be kept in a preferred range, even if the foam production and therefore the water consumption in lower vessel 2 does not take place due to a defect.

It is to be noted that the shape of the base areas, the number and the arrangement of the vessels relative to one another according to the features of claim 1 allow for a variety that is not shown in the figures. An embodiment without a housing around the vessels is also conceivable.

REFERENCE CHARACTERS

1 device
2 lower vessel
3 middle vessel
4 upper vessel
5 outlet region
6 foam outlet opening
7 bubble plate/membrane
8 air supply
9 water tank
10 supply line for the component producing foam
11 supply line for disinfectant
12 supply line
13 sensor
14 overflow
15 float switch
16 water supply
22 opening of the lower vessel
23 opening of the middle vessel
24 opening of the upper vessel
25 tube
26 foam outlet head
27 battery
28 housing

What is claimed is:

1. A device for producing foam for wellness and/or hygiene applications with a vessel to be filled with a mixture of water and a component producing foam, where said vessel comprises:
    a plurality of devices for blowing air into said mixture to produce foam,
    wherein said device comprises at least two vessels to be filled with said mixture arranged one above the other in a vertical direction in tiers,
    where each of said at least two vessels comprises one of said plurality of devices for blowing air into said mixture to produce foam,
    where said at least two vessels are open towards an outlet region such that the foam produced in said at least two vessels is merged in said outlet region,
    wherein said plurality of devices for blowing air are configured such that the air is introduced from a base of a respective one of said at least two vessels over an area of at least 40% of the base of the respective one of said at least two vessels, and
    wherein a tube is connected to said foam outlet opening, where a shower head with a controllable foam outlet is connected to said tube.

2. The device according to claim 1, wherein said at least two vessels have openings facing said outlet region and a height between the bases of said at least two vessels and upper sides of said at least two vessels increases towards said openings, where said upper sides are formed to be curved.

3. The device according to claim 1, wherein said blower devices for blowing air in include bubble membranes selected from a group that consists of bubble plates, membranes, or films.

4. The device according to claim 3, wherein said bubble plates, membranes, or films are configured such that substantially no water and component producing foam can flow back through said bubble plates, membranes, or films when no air is blown in.

5. The device according to claim 1, wherein said devices for blowing air in comprise a controllable ventilation unit which controls the amount of air introduced into said at least two vessels, where a separate ventilation unit is connected to each vessel.

6. The device according to claim 1, wherein said at least two vessels are enclosed in a housing which comprises a foam outlet opening from said outlet region.

7. A device for producing foam for wellness and/or hygiene applications with a vessel to be filled with a mixture of water and a component producing foam, wherein said vessel comprises:
- a device for blowing air into said mixture to produce foam,
- wherein said device comprises at least two vessels to be filled with said mixture arranged one above the other in a vertical direction in tiers,
- wherein said at least two vessels comprise said device for blowing air into said mixture to produce foam,
- wherein said at least two vessels are open towards an outlet region such that the foam produced in said at least two vessels is merged in said outlet region, and
- wherein said at least two vessels are arranged and configured in relation to one another such that water and said component producing foam, which deposit from the foam produced within said device, can flow back into at least one of said at least two vessels so that foam can be produced again with this water.

8. A device for producing foam for wellness and/or hygiene applications with a vessel to be filled with a mixture of water and a component producing foam, where said vessel comprises:
- a device for blowing air into said mixture to produce foam,
- wherein said device comprises at least two vessels to be filled with said mixture arranged one above the other in a vertical direction in tiers,
- where said at least two vessels comprise said device for blowing air into said mixture to produce foam,
- where said at least two vessels are open towards an outlet region such that the foam produced in said at least two vessels is merged in said outlet region, and
- wherein said the device comprises a water level adjustment system in said at least two vessels.

9. The device according to claim 8, wherein said water level adjustment system in said at least two vessels is connected to an external water supply and/or a water tank.

10. The device according to claim 9, wherein said water tank comprises a water temperature control unit and/or a cold pack.

11. The device according to claim 8, wherein said device comprises a component addition producing foam which is connected to said water level adjustment system.

12. The device according to claim 8, wherein said device comprises a disinfectant addition which is connected to said water level adjustment system.

13. A device for producing foam for wellness and/or hygiene applications with a vessel to be filled with a mixture of water and a component producing foam, where said vessel comprises:
- a device for blowing air into said mixture to produce foam,
- wherein said device comprises at least two vessels to be filled with said mixture arranged one above the other in a vertical direction in tiers,
- where said at least two vessels comprise said device for blowing air into said mixture to produce foam,
- where said at least two vessels are open towards an outlet region such that the foam produced in said at least two vessels is merged in said outlet region, and
- wherein said device comprises a battery for operating said device.

* * * * *